US012675034B2

(12) United States Patent
van Leer et al.

(10) Patent No.: US 12,675,034 B2
(45) Date of Patent: Jul. 7, 2026

(54) MOUNTING ASSEMBLY FOR MOUNTING A CAMERA AND A RELATED METHOD

(71) Applicant: Topgolf Sweden AB, Danderyd (SE)

(72) Inventors: John van Leer, Hagersten (SE); Ulf Tragardh, Akersberga (SE)

(73) Assignee: Topgolf Sweden AB, Danderyd (SE)

( * ) Notice: Subject to any disclaimer, the term of this patent is extended or adjusted under 35 U.S.C. 154(b) by 153 days.

(21) Appl. No.: 18/767,782

(22) Filed: Jul. 9, 2024

(65) Prior Publication Data

US 2025/0085616 A1      Mar. 13, 2025

(30) Foreign Application Priority Data

Sep. 8, 2023    (SE) ..................................... 2330390-2

(51) Int. Cl.
*G03B 17/56*          (2021.01)
*F16M 13/02*          (2006.01)
(52) U.S. Cl.
CPC ........... *G03B 17/561* (2013.01); *F16M 13/02* (2013.01)

(58) Field of Classification Search
CPC .............................. G03B 17/561; F16M 13/02
See application file for complete search history.

(56) References Cited

U.S. PATENT DOCUMENTS 7,425,101 B2 * 9/2008 Cheng .................... G03B 17/00
396/419

* cited by examiner

*Primary Examiner* — Minh Q Phan
(74) *Attorney, Agent, or Firm* — Noréns Patentbyrå AB

(57) ABSTRACT

A mounting assembly (100) for mounting a camera (2) at a construction (1) and a related method are disclosed. A mounting part (200) is arranged to be mounted at the construction (1); and an attachment part (300) is arranged to be attached to the camera (2). Mounting plates (221, 222) comprises a respective open slot (231, 232), and a respective rotation through hole (241, 242). Guiding plates (321, 322) comprises a respective guiding element (331, 332) and a respective center through hole (341, 342) that is located to be capable of being aligned with the respective rotation through hole (241, 242) of said each mounting plate (221, 222) when the respective guiding element (331, 332) is located in the respective open slot (231, 232).

17 Claims, 8 Drawing Sheets

MOUNTING ASSEMBLY FOR MOUNTING A CAMERA AND A RELATED METHOD

CROSS REFERENCES TO RELATED APPLICATIONS

The Present application claims priority to Swedish patent application number 2330390-2, filed on Sep. 8, 2023, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to the mounting of cameras.

Description of the Related Art

Such cameras tend to be relatively heavy and are typically mounted relatively high up in the air, as compared to the height of a human installer. The mounting, or installation, of the camera poses several challenges as will be explained in the following.

Using conventional brackets, installation personnel are therefore required to manipulate the relatively heavy camera at relatively big heights. Even if using a ladder, this may entail working in ergonomically problematic positions, such as above the head of the installer. A disadvantage is hence that the installation is cumbersome, and it may require a certain strength to cope with the weight of the camera.

BRIEF SUMMARY OF THE INVENTION

An object may be to eliminate, or at least reduce, one or more of the abovementioned problems and/or disadvantages.

This object, and possibly other objects, may be achieved by at least some embodiments herein.

According to an aspect, the object is achieved by a mounting assembly for mounting a camera at a construction. The mounting assembly comprises a mounting part arranged to be mounted at, or to, the construction; and an attachment part arranged to be attached to the camera. One of the mounting part and the attachment part, referred to as "first part", comprises a first plate body, and two mounting plates that are arranged spaced away from and possibly parallelly, e.g. substantially parallelly, with each other. The two mounting plates are arranged to extend away from said first plate body in a vertical plane of the mounting assembly when mounted at the construction. Each mounting plate of the two mounting plates comprises a respective open slot having a first arc-shape, and a respective rotation through hole located at a respective center point with respect to the first arc-shape of the respective open slot. The respective rotation through holes of the mounting plates define a common rotation axis that is perpendicular to the two mounting plates. The respective open slot has a respective opening to a respective edge of said each mounting plate for receiving a respective guiding element of the other one of the mounting part and the attachment part, referred to as "second part". The second part comprises a second plate body, and two guiding plates that are arranged spaced away from and possibly parallelly with each other. The two guiding plates extend away from the second plate body in the vertical plane of the mounting assembly when mounted at the construction. Each guiding plate of said two guiding plates comprises the respective guiding element that is arranged to be received by the respective open slot of said each mounting plate, via the respective opening, and a respective center through hole that is located to be capable of being aligned with the respective rotation through hole of said each mounting plate when the respective guiding element is located in the respective open slot.

Thanks to the respective open slot and the respective guiding element, the first and second parts can be easily put together, i.e. such that the weight of the camera can be held completely, or at least in part, by the mounting assembly, e.g. during various parts of an installation of the camera. As the weight of the camera is at least partially held by the mounting assembly, mounting of the camera and adjustment of a viewing direction of the camera is facilitated.

According to another aspect, the object is achieved by a method for mounting a camera at a construction using a mounting assembly of any one of the preceding claims. The first part is attached to the camera and the second part is mounted at the construction. The method comprises a number of actions. The camera is moved such that the respective guiding element is fed into the respective opening and guided by the respective opening and the respective open slot into a respective position in the respective open slot, e.g. In which the camera is supported by an engagement between the respective opening and the respective guiding element. Then the camera is tilted until the respective rotation through hole is aligned with the respective center through hole.

At least one rotation shaft is inserted in the respective rotation through hole and the respective center through hole. The camera's viewing direction is adjusted, by rotation of the camera about the rotation shaft.

Furthermore, the camera is fixed, e.g. in position and/or rotation e.g. by being steadily mounted, by fixating the mounting part relatively the attachment part by means of one or more of: when said at least one rotation shaft comprises at least one rotation screw, by fastening said at least one rotation screw; when at least one of the respective guiding element of said two guiding plates comprises a guiding screw, by fastening the guiding screw, and; when said each mounting plate comprises the respective closed slot, by fastening at least one respective second screw that has been inserted into the respective closed slot.

Thanks to that the first and second parts can be rotatably connected via the respective guiding element and the respective position of the respective open slot, at least a portion of the weight of the camera can be supported by the mounting assembly. Such support of the weight of the camera can be achieved as per movement of the camera such that the respective guiding element is fed into the respective opening and guided by the respective opening and the respective open slot into the respective position. The user may hence then more easily, since the entire weight of the camera need not be carried by the user, rotate—e.g. about a temporary geometric rotation axis running through the respective positions—the first and second parts relatively each other until the respective rotation through hole and the respective center through hole are aligned. Subsequently, the rotation shaft is inserted, and then the viewing direction of the camera is adjusted and, e.g. in a later step, the camera is fixed in its position by one or more screws, such as fixing screw or the like.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
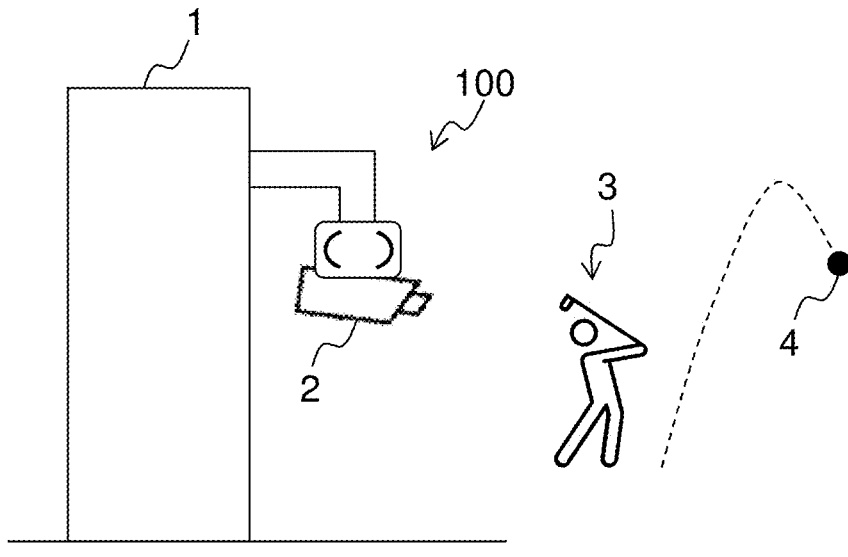
FIG. 1 is an overview of an environment in which the mounting assembly according to the embodiment herein can be used to install a camera.

FIG. 1 shows a mounting assembly 100 for mounting a camera 2 at, or to, a construction 1. In some examples, the mounting assembly 100 can be arranged to adjustably mount the camera 2 at the construction 1.

The construction 1 is generally stable in order to reduce a risk of that the camera's 2 position and/or orientation is changed after it has been mounted. The construction 1 may be a building, a truss pillar, a structure, a mast, a rigid and stable object or construction, or the like. For purposes of illustrating an example of how the mounting assembly can be used with the camera 2, a golf player 3 is shown in FIG. 1. Accordingly, the camera 2 may be used for making a video of the golf player and/or tracking a golf ball 4 and/or the like. The camera 2 can include one or more image sensors and/or one or more radar sensors and/or one or more similar sensors. Examples of similar sensors include lidar sensors, light sensor or the like. Generally, the mounting assembly 100 is adapted to support, mount and hold an object, whose weight is up to 50 kg, up to 35 kg, up to 25 kg. In some examples, the camera's 2 weight can be about 5 kg, up to 10 kg, up to 20 kg or the like.

Figure 2:
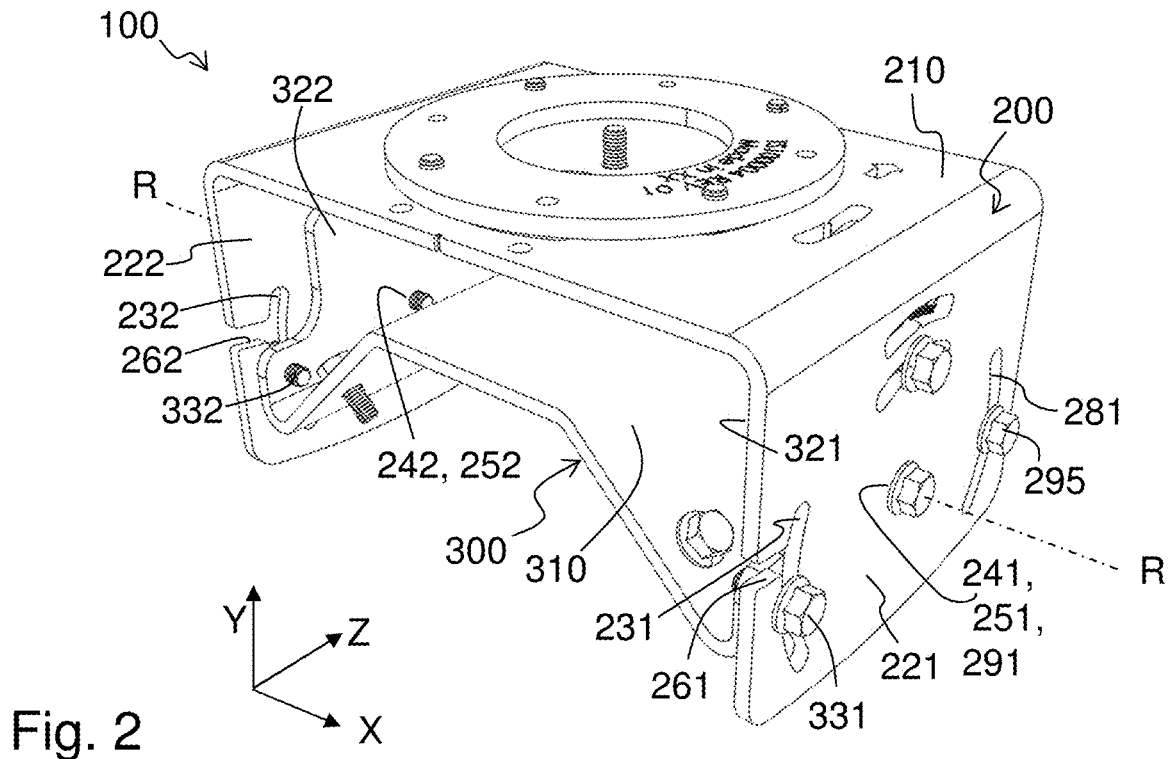
FIG. 2 is a view illustrating an example of the mounting assembly according to some embodiments herein.

FIG. 2 shows an exemplifying mounting assembly 100 for mounting the camera 2 at the construction 1.

The mounting assembly 100 comprises a mounting part 200 arranged to be mounted at, or to, the construction 1, and an attachment part 300 arranged to be attached to the camera 2. One of the mounting part 200 and the attachment part 300 can be referred to as "first part 200, 300" and the other one of the mounting part 200 and the attachment part 300 can be referred to as "second part 200, 300". This will be elaborated upon further below, and it shall be understood that in the example of FIG. 2, the first part 200, 300 refers to the mounting part 200 and the second part 200, 300 refers to the attachment part 300. The mounting part 200 and the attachment part 300 can generally be separable from each other. In some examples herein, the first part 200, 300 can be arranged to receive the second part 200, 300, or vice versa.

With that in mind, the first part 200, 300, i.e. the mounting part 200 of FIG. 2, comprises a first plate body 210 and two mounting plates 221, 222. The two mounting plates 221, 222 are arranged spaced away from and possibly parallelly with each other. The two mounting plates 221, 222 are arranged to extend away from said first plate body 210 in a vertical plane of the mounting assembly 100 when the mounting assembly 100 is mounted at the construction 1. Evidently, this means that the vertical plane of the mounting assembly 100 is vertical when the mounting assembly 100 is mounted at the construction 1.

Furthermore, each mounting plate 221, 222 of the two mounting plates 221, 222 comprises a respective open slot 231, 232 having a first arc-shape. The first arc-shape can be a minor arc, e.g. a first angle between two radial lines from the center of the first arc-shape to a respective end of the first arc-shape is less than 180 degrees, less than 120 degrees or the like. In some examples, the first angle is greater than 10 degrees, greater than 45 degrees or the like. The aforementioned examples of the first angle can be combined to form intervals where the first angle is e.g. between 10 and 180 degrees, between 45 and 120 degrees or the like. In some examples, it may be expressed as that said each mounting plate 221, 222 is provided with a respective first arc-shaped slot, e.g. in in the form of a respective elongated through hole in said each mounting plate 221, 222.

Additionally, said each mounting plate 221, 222 comprises a respective rotation through hole 241, 242 located at a respective center point 251, 252 with respect to the first arc-shape of the respective open slot 231, 232. The respective rotation through holes 241, 242 of the mounting plates 221, 222 together define a common rotation axis R that is perpendicular to the two mounting plates 221, 222. In more detail, the respective center point 251, 252 can be located relatively a circle defining the first arc-shape. The first arc-shape is thus defined by a portion of the circle. The common rotation axis R runs through the respective center point 251, 252 of the respective open slot 231, 232.

In some examples, the respective rotation through hole 241, 242 is located at the respective center point 251, 252.

The respective open slot 231, 232 has a respective opening 261, 262 to a respective edge 271, 272 of said each mounting plate 221, 222 for receiving a respective guiding element 331, 332 of the second part 200, 300, e.g. by sliding the guiding element 331, 332 in a direction that is parallel to a main plane of the mounting plate 221, 222. The guiding element 331, 332 can be a guiding screw or the like.

The second part 200, 300 comprises a second plate body 310. The second plate body 310 can be embodied by a plate that has been shaped to receive and mount the camera 2. The second plate body 310 can receive the camera e.g. by having a cross-section in the XY-plane that can be half-circular, V-shaped, truncated V-shaped (as in FIG. 4) or the like. In this manner, the camera can be fastened, or mounted, at the second plate body 310, e.g. using screws or the like.

The second part 200, 300 further comprises two guiding plates 321, 322 (see FIG. 4) that are arranged spaced away from and possibly parallelly with each other. The two guiding plates 321, 322 extend away from the second plate body 310 in the vertical plane of the mounting assembly 100 when mounted at the construction 1. The notion "guiding" in the expression "two guiding plates 321, 322" is used to distinguish them from the two mounting plates 221, 222. This means that the two mounting plates 221, 222 can be referred to as "two first plates 221, 222" and the two guiding plates 321, 322 may be referred to as "two second plates 321, 322", where "first" and "second" distinguishes the plates from each other rather than the labels "mounting" and "guiding".

Each guiding plate 321, 322 of said two guiding plates 321, 322 includes, or is provided with, the respective guiding element 331, 332 that is arranged to be received by the respective open slot 231, 232 of said each mounting plate 221, 222, via the respective opening 261, 262. Generally, there are thus two guiding elements 331, 332, i.e. one for each guiding plate 321, 322. The respective guiding element 331, 332 can be separable from said each guiding plate 321, 322 or it can be integrated with said each guiding plate 321, 322.

Furthermore, said each guiding plate 321, 322 comprises a respective center through hole 341, 342 that is located to be capable of being aligned with the respective rotation through hole 241, 242 of said each mounting plate 221, 222 when the respective guiding element 331, 332 is located in the respective open slot 231, 232.

As mentioned, in this example the first part 200, 300 refers to the mounting part 200 and the second part 200, 300 refers to the attachment part 300. However, in some examples, the first part 200, 300 refers to the attachment part 300 and the second part 200, 300 refers to the mounting part 200. In these examples, the mounting part 200 comprises the first plate body 210 and the two mounting plates 221, 222. Furthermore, in these examples, the attachment part 300 comprises the second plate body 310 and the two guiding plates 321, 322.

FIG. 4 through FIG. 7 show further details of the example according to various embodiments herein.

Figure 4:
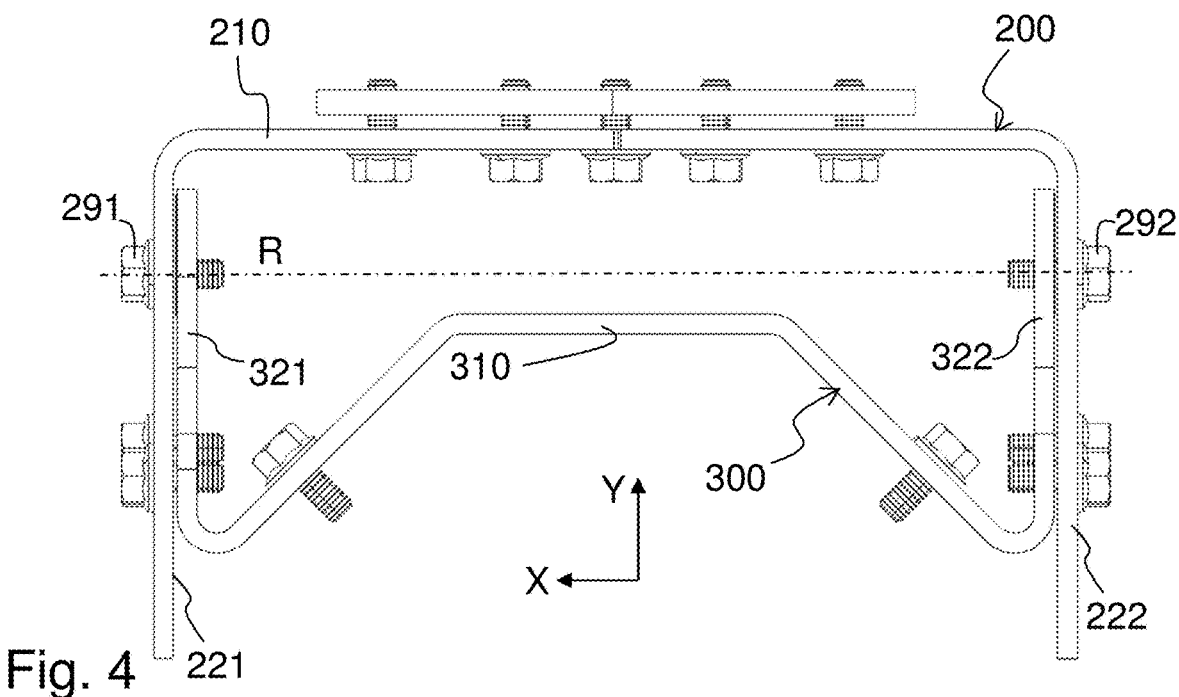
FIG. 4 is a further view illustrating the example of the mounting assembly according to some embodiments herein.

FIG. 4 shows e.g. that the common rotation axis R runs through the two mounting plates 221, 222, i.e. at the respective rotation through hole 241, 242, through the two guiding plates 321, 322, i.e. at the respective center through hole 341, 342, and through the center of said at least one rotation shaft 291, 292.

Figure 5:
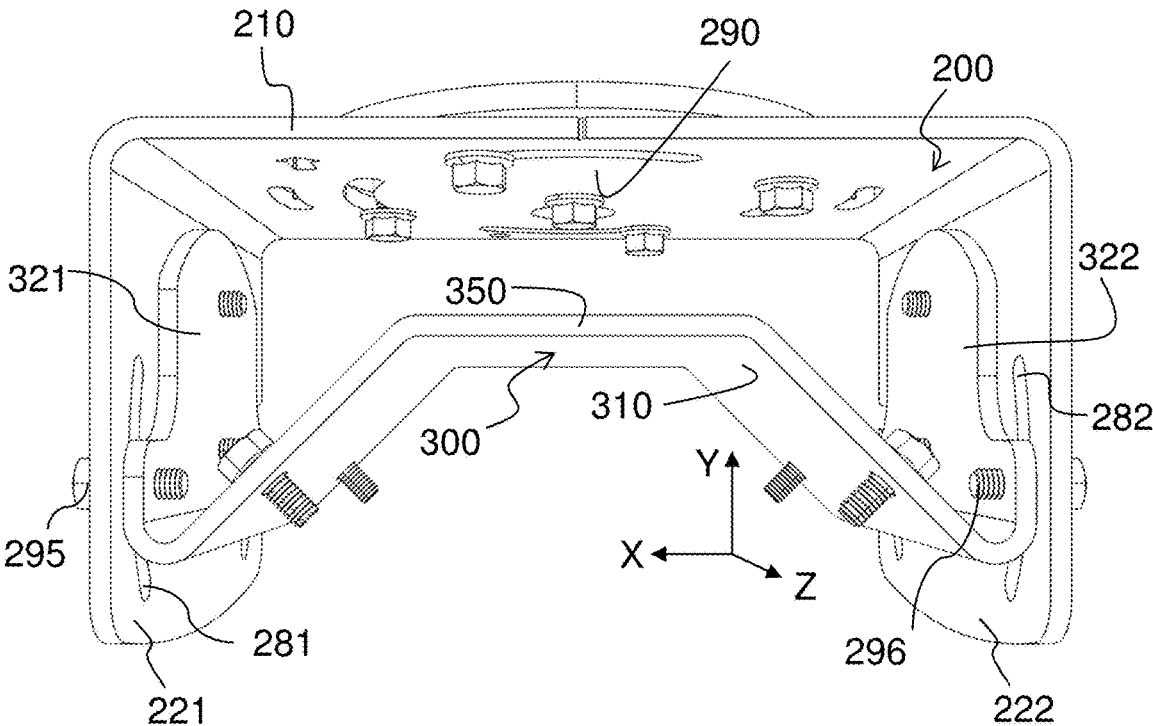
FIG. 5 is yet another view illustrating the example of the mounting assembly according to some embodiments herein.

FIG. 5 shows e.g. that the two guiding plates 321, 322 can be in close proximity to, or abut, the two mounting plates 221, 222.

Figure 6:
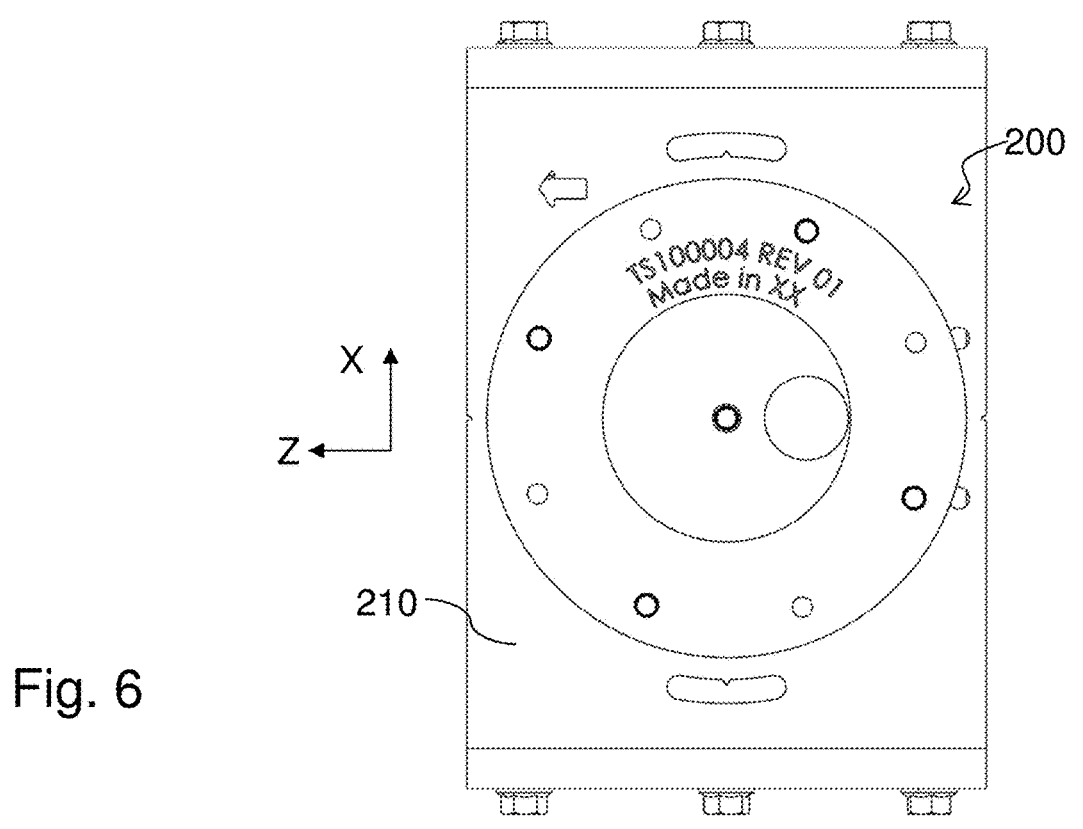
FIG. 6 is a still other view illustrating the example of the mounting assembly according to some embodiments herein.

FIG. 6 shows e.g. that the mounting assembly 100 can be shaped as a rectangle, when seen from above, e.g. as when mounted at the construction 1.

Figure 3:
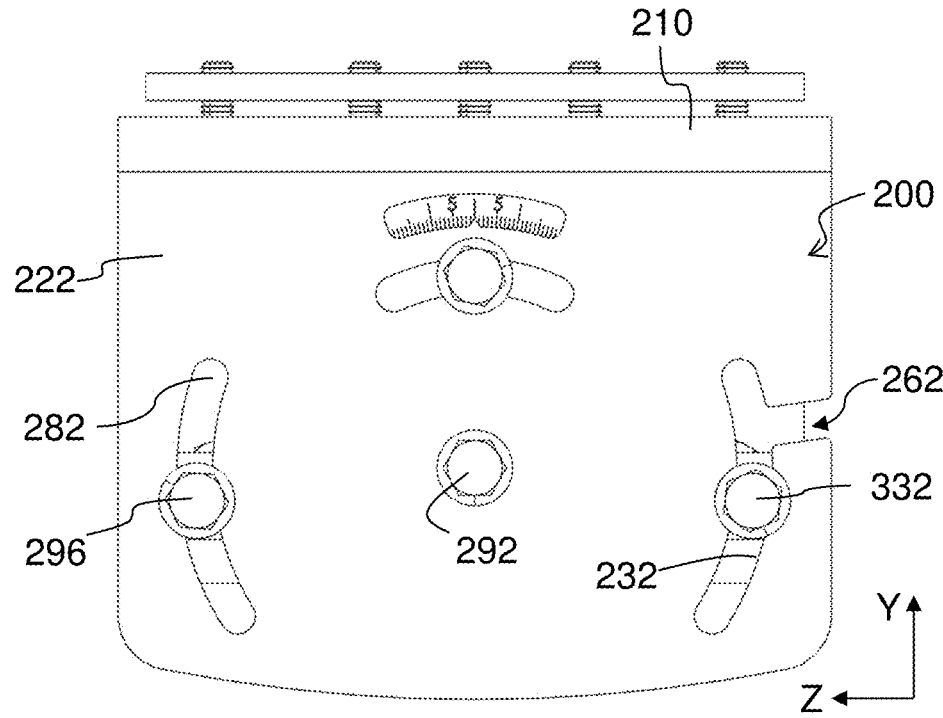
FIG. 3 is another view illustrating the example of the mounting assembly according to some embodiments herein.
Figure 7:
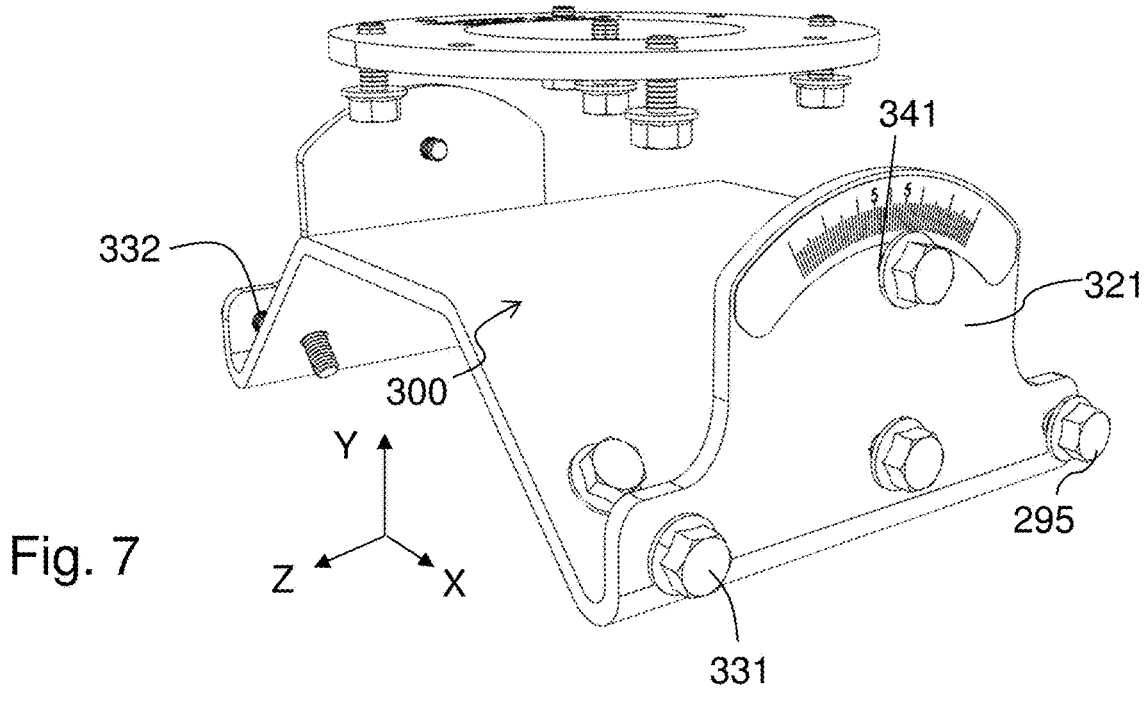
FIG. 7 is a still further view illustrating the example of the mounting assembly according to some embodiments herein.
Figure 8A:
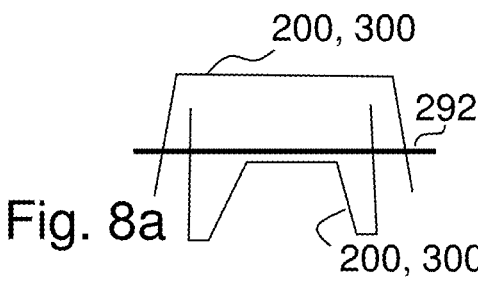
FIG. 8a is an alternative embodiment of a mounting assembly.
Figure 8B:
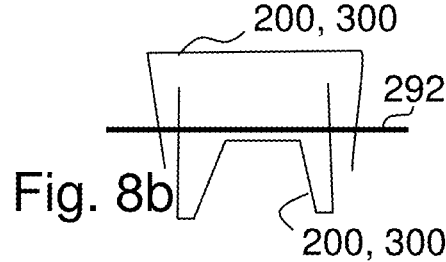
FIG. 8b is an alternative embodiment of a mounting assembly.
Figure 8C:
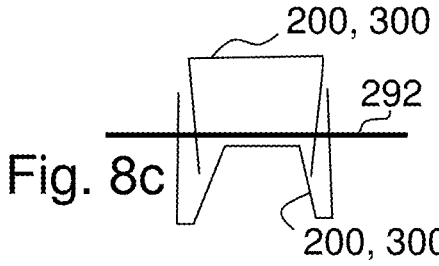
FIG. 8c is an alternative embodiment of a mounting assembly.
Figure 8D:
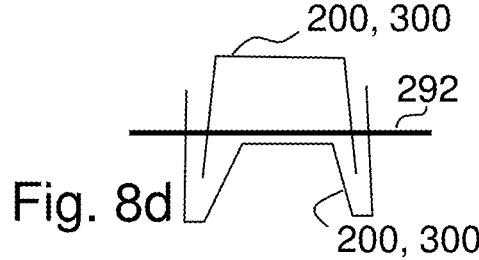
FIG. 8d is an alternative embodiment of a mounting assembly.
Figure 8E:
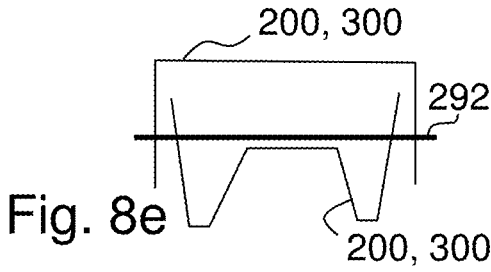
FIG. 8e is an alternative embodiment of a mounting assembly.
Figure 8F:
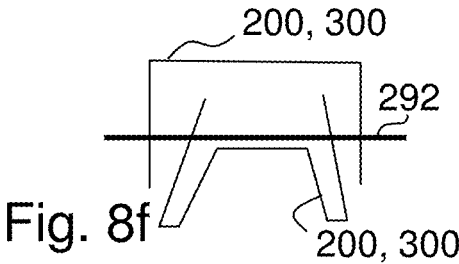
FIG. 8f is an alternative embodiment of a mounting assembly.
Figure 8G:
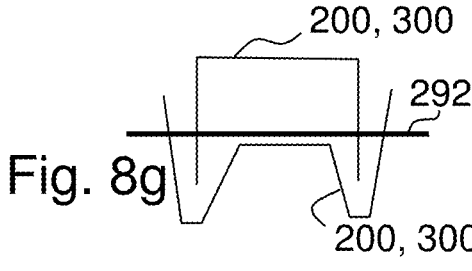
FIG. 8g is an alternative embodiment of a mounting assembly.
Figure 8H:
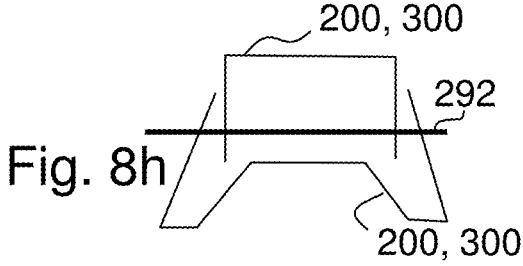
FIG. 8h is an alternative embodiment of a mounting assembly.
Figure 8I:
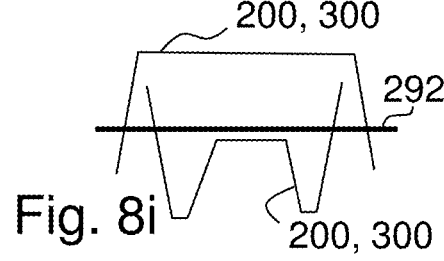
FIG. 8i is an alternative embodiment of a mounting assembly.
Figure 8J:
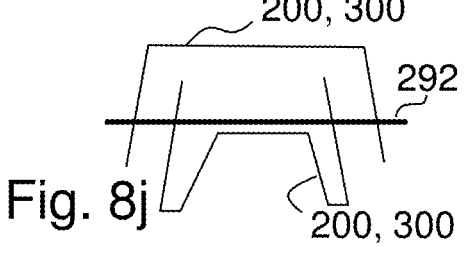
FIG. 8j is an alternative embodiment of a mounting assembly.
Figure 10A:
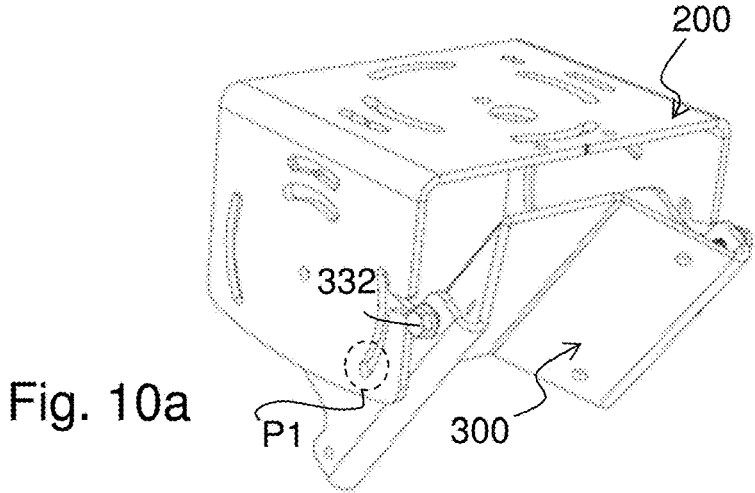
FIG. 10a through FIG. 10h are additional views illustrating the mounting assembly in different positions for various actions of the method illustrated with reference to FIG. 9.
Figure 10B:
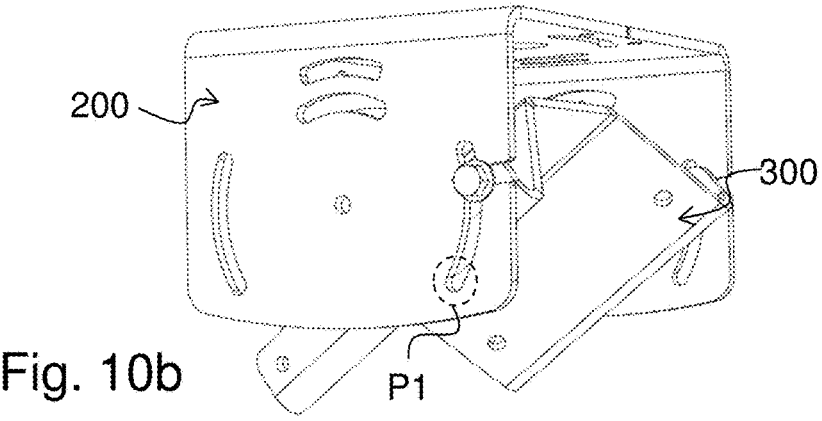
Figure 10C:
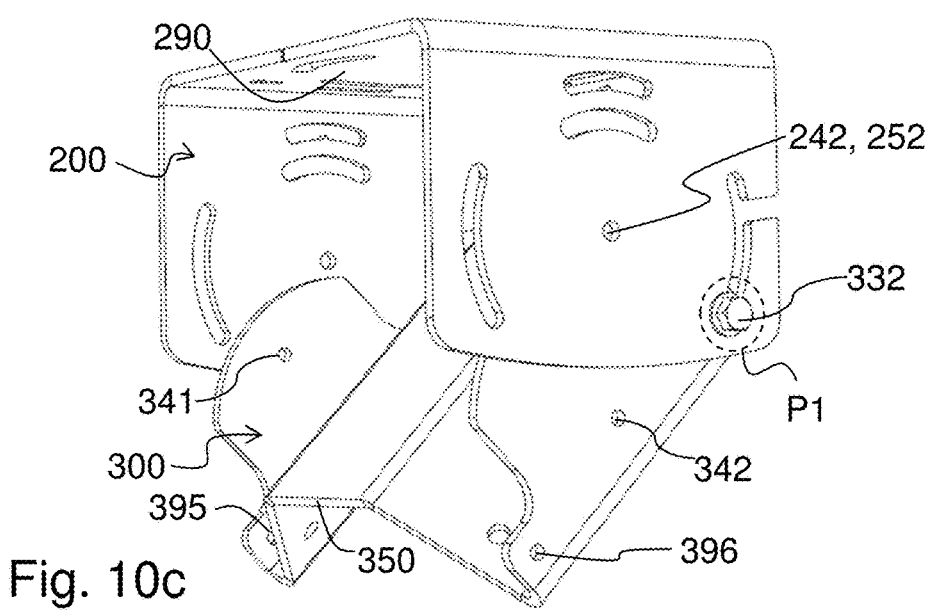
Figure 10D:
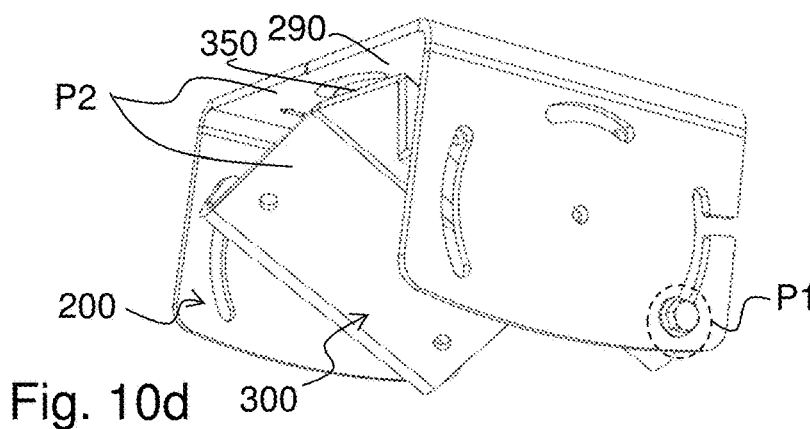

FIG. 7 shows e.g. that the attachment part 300 can be provided with the respective guiding element 331, 332. The mounting assembly 100 can therefore comprise the respective guiding element 331, 332, such as a screw, a bolt, or the like. Similarly, it is shown that at least one respective second screw 295, 296 can be fastened in the attachment part 300, e.g. in a respective further through hole 395, 396 (shown in FIG. 10*c*). Said at least one respective second screw 295, 296 can run through a respective closed slot 281, 282 of said each mounting plate 221, 222 (not shown in FIG. 7, see FIG. 2 and FIG. 3). The respective closed slot 281, 282 is closed in that the slot can only be accessed, e.g. by a screw, bolt, pin, rod, or the like, by insertion along the x-axis, but not by sliding into the slot in the YZ-plane. In contrast thereto, "open slot" means that the slot can be accessed by sliding, e.g. a screw, a pin, a rod, a guiding element, or the like, into the slot, e.g. in the YZ-plane, as shown in FIG. 3 for the open slot 232 having the opening 262. In some examples, the respective closed slot 281, 282 can be replaced by a respective further open slot (not shown in the Figures). Further, the mounting assembly 100 can then comprise said at least one respective second screw 295, 296.

In some examples herein, the two mounting plates 221, 222 and the two guiding plates 321, 322 are parallel with each other when the mounting assembly 100 is assembled to be capable of mounting the camera 2 at the construction 1. Expressed differently, the first part 200, 300 can be pivotally connected to the second part 200, 300, e.g. by means of at least one rotation shaft 291, 292, shown in FIG. 3. Accordingly, the mounting assembly 100 can comprise said at least one rotation shaft 291, 292, e.g. when the first and second parts are put together for the purpose of holding the camera 2. When the two mounting plates 221, 222 and the two guiding plates 321, 322 then abut each other, the mounting assembly 100 can be more stable than when the plates 221, 222, 321, 322 do not abut each other.

FIGS. 8*a*-8*j* illustrate various exemplifying, non-exhaustive examples of the mounting assembly 100, in which the mounting plates 221, 222 deviates from being parallel with the guiding plates 321, 322. In some of these embodiments, there is a play, such as a gap, a space or the like, between the two mounting plates 221, 222 and the two guiding plates 321, 322 that creates a margin, whereby it can be allowed that the two mounting plates 221, 222 and the two guiding plates 321, 322 are non-parallel, but e.g. slightly aligned. Slightly aligned can refer to a deviation from parallel with less than 20 degrees, 10 degrees, 5 degrees or the like. In general, it can be said that the first and second parts 200, 300 can be arranged relatively each other to allow rotation relatively each other about said at least one rotation shaft 291, 292, shown as rotation shaft 292 in the Figures.

In some examples, said each mounting plate 221, 222 comprises a respective closed slot 281, 282 that has a second arc-shape and whose respective center with respect to the second arc-shape of the respective closed slot 281, 282 is located at the respective rotation through hole 241, 242. This means that the closed slot's center is defined by the second arc-shape. In some examples, the respective closed slot 281, 282 can be an open slot similarly to the respective open slot 231, 232. Similarly as for the first arc-shape, in some examples, a respective further center point (not shown) of the respective closed slot 281, 282 can be located relatively a circle defining the second arc-shape. The respective further center point can be the respective center point 251, 252. Again, the common rotation axis R runs through the respective further center point of the respective closed slot 281, 282.

In some examples, it may be expressed as that said each mounting plate 221, 222 is provided with a respective second arc-shaped slot, e.g. in in the form of a respective elongated through hole in said each mounting plate 221, 222. The open and/or closed slots 231, 232, 281, 282 can be elongated, e.g. along a vertical direction when the mounting assembly 100 is mounted at the construction 1. Generally, the open and/or closed slots 231, 232, 281, 282 can have a common center point at the respective rotation through holes. Thanks to that the slots are elongated, the position and/or orientation of the camera 2 may be adjusted. Moreover, thanks to that the open slots run generally along the vertical direction, the camera 2 is able to hang in the open slot before being fastened. Generally, a path of the open slot 231, 232 can be said to have a minimum, e.g. local or globally for the slot, at which the guiding element 331, 332 can rest. In this manner, mounting of the camera 2 is facilitated, since some or all of the weight of the camera 2 may be supported via the mounting plates having the open slots, e.g. by that the guiding element 331, 332 rests at the minimum of the path describing the open slot 231, 232, e.g. in the YZ-plane.

In some examples, said each guiding plate 321, 322 comprises a respective further through hole 395, 396 located to be aligned with a part of the respective closed slot 281, 282 when the respective rotation through hole 241, 242 and the respective center through hole 341, 342 are aligned with each other.

In some examples, the second plate body 310 comprises a stop edge 350 configured to define a distinct spatial relationship P2 (see FIG. 10*e*) between the first and second parts 200, 300. The plate body 210 comprises an abutment surface 290 configured to define the distinct spatial relationship. The stop edge 350 and the abutment surface 290 can jointly, e.g. cooperatively, define the distinct spatial relationship P2. A face of the stop edge 350 can face a direction that is perpendicular to a rotation direction of the rotation axis R. The face can be on a non-protruding or protruding part of the second plate body 310. The first and second parts 200, 300 are capable of assuming the distinct spatial relationship P2 when the stop edge 350 abuts the abutment surface 290 and when the respective guiding element 331, 332 is received by the respective open slot 231, 232. The respective rotation through hole 241, 242 is aligned with the respective center through hole 341, 342 in the distinct spatial relationship P2. The distinct spatial relationship P2 can define a possible interval of rotation for the first plate body 210 in relation to the second plate body 310 about the shafts.

In this manner, alignment of the respective rotation through hole 241, 242 with the respective center through hole 341, 342 is facilitated. This thus also paves the way for an easy insertion of said at least one rotation shaft 291, 292, e.g. into the aligned through holes, i.e. the respective rotation through hole 241, 242 and the respective center through hole 341, 342. The distinct spatial relationship P2 is also described in connection with the Figures mentioned in the description of the method illustrated in FIG. 9.

The respective guiding element 331, 332 can include a respective guiding screw, a respective guiding pin or the like. The respective guiding element 331, 332 may or may not be provided with threads. As mentioned, there can generally be two guiding elements 331, 332. Explicitly, this means that the two guiding elements 331, 332 comprises the respective guiding element for said each guiding plate 321, 322. The two guiding elements 331, 332 can embodied in the same or different manners. E.g., one guiding element can be a screw and the other guiding element can be a pin, e.g. without threads.

The respective guiding element 331, 332 can be perpendicular to said each mounting plate 221, 222 when being received and guided by the respective opening 261, 262 into the respective open slot 231, 232.

The mounting part 200 and the attachment part 300 can be configured to correspond to each other to adjustably mount the camera 2 at the construction 1.

In some examples, at least one of the two mounting plates 221, 222 and/or at least one of the two guiding plates 321, 322 is/are made of metal. It may be that all of the plates are made of metal. In various example, there can thus be two metal mounting plates 221, 222, i.e. said two mounting plates 221, 222 are made of metal. Further, there can thus be two metal guiding plates 321, 322, i.e. two guiding plates 321, 322 that are made of metal.

In some examples, a plurality of slots 231, 232, 281, 282 can include the respective open slot 231, 232 of said each mounting plate 221, 222 and/or the respective closed slot 281, 282 of said each guiding plate 321, 322. A respective arc-shape of at least some of the plurality of slots 231, 232, 281, 282 can have a common radius, preferably all. However, in some examples, a respective arc-shape of one or more of said plurality of slots can have a radius that is different from a radius of an arc-shape of one or more other slots, even if their respective center point is the same.

In some examples, at least one of the two mounting plates 221, 222 at least partly surrounds at least one of the two guiding plates 321, 322 in an axial direction. The relation between the plates 221, 222, 321, 322 may be described as that at least one of the two mounting plates is located axially distally of at least one of the guiding plates, e.g. with respect to a point on the rotation axis that is located in the interior, e.g. the center, of the mounting assembly 100. Expressed differently, the two mounting plates 221, 222 and the two guiding plates 321, 322 are radially overlapping with each other when joined, e.g. using at least one rotation shaft 291, 292 and sometimes two rotation shafts 291, 292, to form the mounting assembly 100. Said at least one rotation shaft can include, e.g. be realized by or the like, one or more screws.

In some examples, at least one of the two guiding plates 321, 322 at least partly axially surrounds at least one of the two mounting plates 221, 222. This is not shown in FIG. 8*a* through FIG. 8*j*. Nevertheless, it is understood that the guiding plates and the mounting plates can be configured, such as formed, shaped, adapted or the like, such that the guiding plates are located distally of the mounting plates, e.g. with respect to said point on the rotation axis R.

Figure 9:
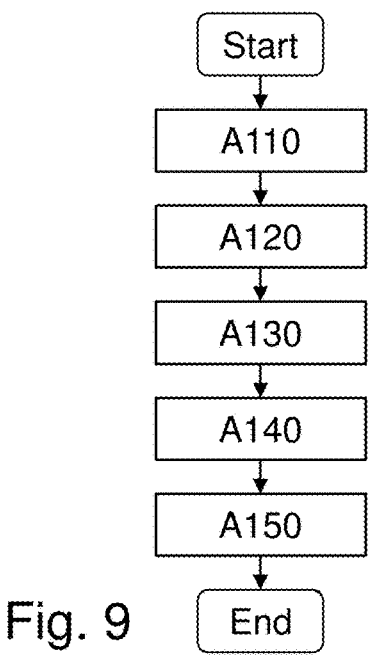
FIG. 9 is a flowchart illustrating examples of the method according to some embodiments herein.

Turning to FIG. 9, a flow chart illustrates a method, e.g. performed by a person, for mounting the camera 2 at the construction 1 using the mounting assembly 100 according to at least some embodiments herein. Initially, e.g. before the method starts, the first part 200, 300 is attached to the camera 2 and the second part 300, 200 is mounted at the construction 1. The person, typically a human, may be a mounting employee, an operator, a maintenance person, an installer, a fitter, a user of the mounting assembly 100, or the like.

As referenced below, FIG. 10*a* through FIG. 10*h* illustrate positions of the first and second part 200, 300 at different points in time during the mounting of the camera 2 using the mounting assembly 100 according to at least some the embodiments herein.

One or more of the following actions may be performed in the following exemplifying order, while in other examples a different order can be applied when reasonably possible.

Action A110

The camera 2 is moved, e.g. by a person, such that the respective guiding element 331, 332 is fed into the respective opening 261, 262 and guided by the respective opening 261, 262 and the respective open slot 231, 232 into a respective position P1 in the respective open slot 231, 232, e.g. in which the camera is supported by the respective guiding element 331, 332 engaging with a portion of the respective open slot 231, 232, where the portion is located at the respective position P1 of the respective open slot, e.g. at the minimum of the path. See FIG. 10*a* through FIG. 10*c*, in which the camera is not shown in order not to obstruct visibility of the mounting assembly 100. For the same reason, the camera 2 may have been omitted in further Figures.

Action A120

The camera 2 is then tilted, e.g. by the person, until the respective rotation through hole 241, 242 is aligned with the respective center through hole 341, 342, e.g. by rotation about an axis that runs through the respective positions P1. See FIG. 10*d*. Given the geometry of the mounting assembly, the tilting and/or rotation can only be performed in one direction, while achieving alignment of the respective rotation through hole 241, 242 and the respective center through hole 341, 342. The tilting can take place while the camera 2 is supported by that the guiding element rest on the minimum of the path.

The titling of the camera 2 can include titling of the camera 2 until the stop edge 350 of the second plate body 310 abuts the abutment surface 290 of the first plate body 210, whereby the first and second parts 200, 300 are arranged in the distinct spatial relationship P2 relatively each other. In the distinct spatial relationship P2, i.e. when the first and second parts are positioned and/or oriented to assume the distinct spatial relationship P2, the respective rotation through hole 241, 242 is aligned with the respective center through hole 341, 342. See for example FIG. 10*d*, before insertion of at least one rotation shaft.

Expressed differently, the respective rotation through hole 241, 242 is aligned with the respective center through hole 341, 342 when the first and second parts 200, 300 are located to assume the distinct spatial relationship P2.

Thus, alignment of the respective rotation through hole 241, 242 and the respective center through hole 341, 342 is facilitated, since the person simply tilts the camera 2 until further titling is not possible anymore due to that the first and second parts 200, 300 are positioned according to the distinct spatial relationship.

Figure 10E:
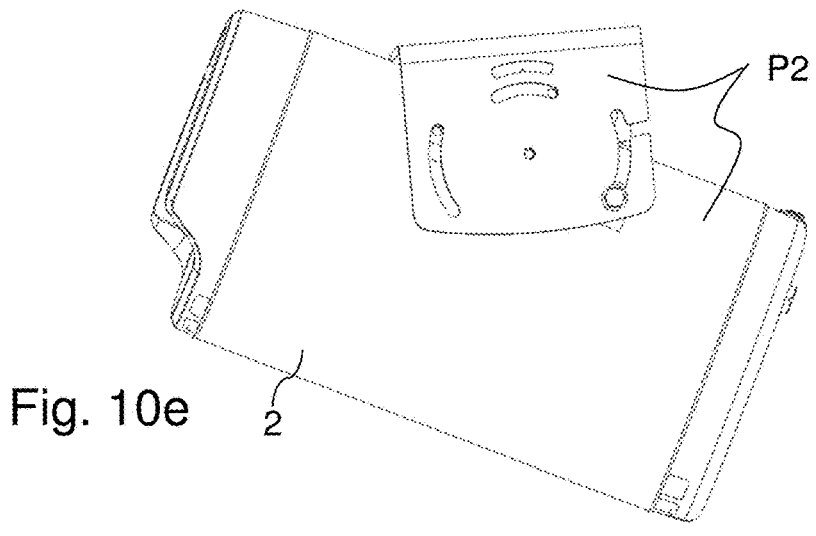

As shown in FIG. 10*e*, the titling of the camera 2 can include titling of the camera 2 until the camera's 2 casing abuts an abutment surface 290 of the first plate body 210, thereby the first and second parts 200, 300 are arranged in the distinct spatial relationship P2 relatively each other as explained above. Accordingly, the distinct spatial relationship P2 can be achieved by abutment of the camera's 2 casing and/or the stop edge 350 against the abutment surface 290.

Action A130

Figure 10F:
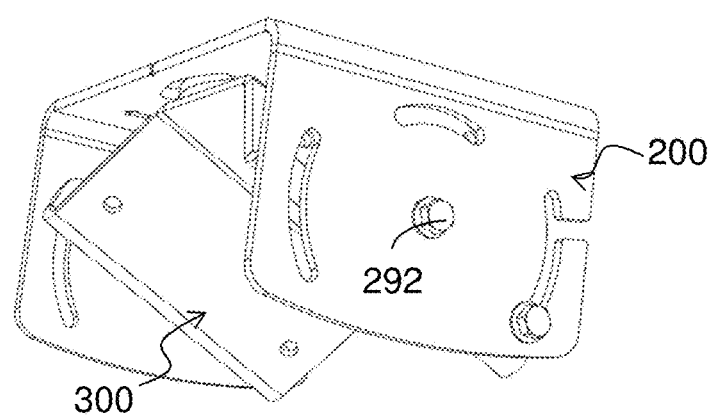
Figure 10G:
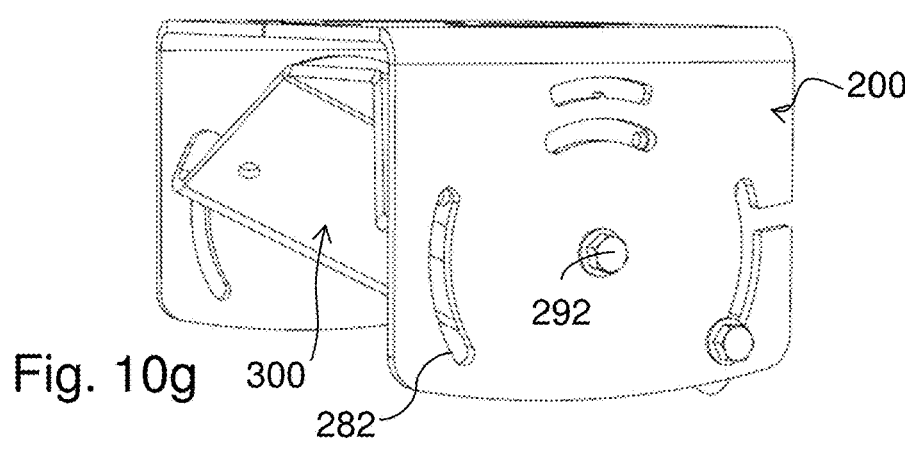
Figure 10H:
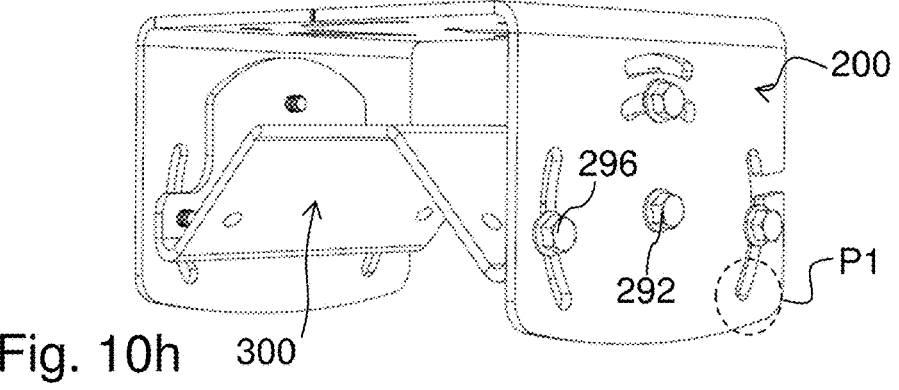

Said at least one rotation shaft is inserted, e.g. by the person, in the respective rotation through hole 241, 242 and the respective center through hole 341, 342 as shown in FIG. 10*f*, e.g. when the distinct spatial relationship P2 between the first and second parts 200, 300 is assumed, or entered. The aforementioned holes 241, 242, 341, 342 are aligned due to said rotation and abutment.

Action A140

The camera's 2 viewing direction is adjusted, e.g. by the person, by rotation of the camera 2 about the rotation shaft. The camera's 2 viewing direction is along the camera's 2 optical axis, e.g. along a straight viewing direction. For example, the viewing direction of the camera 2 can be adjusted by rotating the camera 2 (not shown) from a position of FIG. 10*g* to a position of FIG. 10*h*.

Action A150

The camera is fixated, e.g. by the person, by fixating the mounting part 200 relatively the attachment part 300 by means of one or more of: when said at least one rotation shaft comprises at least one rotation screw, by fastening said at least one rotation screw, when at least one of the respective guiding element 331, 332 of said two guiding plates 321, 322 comprises a guiding screw, by fastening the guiding screw, when said each mounting plate 221, 222 comprises the respective closed slot 281, 282, by fastening at least one respective second screw that has been inserted into the respective closed slot 281, 282, and the like, such as using any additional or other fixing screws.

Thanks to that the first and second parts 200, 300 initially, e.g. In action A110 and/or A120, are rotatably connected via the respective guiding element 331, 332 and the respective position P1 of the respective open slot 231, 232, a portion of the weight of the camera 2 is supported by the mounting assembly 100. The user/installer may hence then more easily, since the entire weight of the camera 2 need not be carried by the user, rotate (tilt the camera), about the respective positions P1, the first and second parts relatively each other until the respective rotation through hole 241, 242 and the respective center through hole 341, 342 are aligned. Subsequently, the rotation shaft is inserted, the viewing direction of the camera is adjusted and then the camera is fixed in its position by one or more screws. In the fixed position, the respective guiding elements 331, 322 are normally positioned away from the respective position P1. See e.g. FIG. 10*h*, which shows multiple screw, while it can be sufficient view fewer screws.

As used herein, the term "screw" may refer to an internally or externally threaded screw that may or may not run into a threaded hole or onto a threaded bolt. If the hole lacks threads, a nut, or screw-nut, may be required. The screw may sometimes run through a non-thread through hole, or slot, and then into a threaded or non-thread hole. Again, if the hole is non-threaded a nut may be required.

As used herein, the term "parallel", "parallelly" or the like, may refer to exactly parallel, substantially parallel, almost parallel or the like. Furthermore, the term "substantially parallel" may refer to that e.g. two plates are parallel given a certain allowable margin of deviation from exactly parallel. As an example, the certain allowable margin may be +/−20 degrees, +/−10 degrees, +/−5 degrees, +/−2 degrees, or the like.

As used herein, the term "arc" may refer to an arc of a circle. Furthermore, in the examples herein, the arc may be a minor arc. This means that e.g. an angle between two radial lines from the center of the arc-shape to a respective end of a circular segment of the arc-shape is less than 180 degrees, e.g. less than an particular angle as specified in the description above.

Thirkettle et al., U.S. Pat. No. 7,056,221 for a Ball Collection Arrangement, is hereby incorporated by reference in its entirety.

Golliffe et al., U.S. Pat. No. 7,059,974 for Golf Balls With Impact Resistant Identification Device, is hereby incorporated by reference in its entirety.

Thirkettle et al., U.S. Pat. No. 7,160,196 for an Identification Device, is hereby incorporated by reference in its entirety.

Thirkettle et al., U.S. Pat. No. 7,337,965 for a Ball Identifying Device, is hereby incorporated by reference in its entirety.

Savarese et al., U.S. Pat. No. 7,691,009 for Apparatus And Methods Relating To Findable Balls, is hereby incorporated by reference in its entirety.

Savarese et al., U.S. Pat. No. 7,766,766 for Methods And Apparatus Relating To Findable Balls, is hereby incorporated by reference in its entirety.

Cheng, U.S. Pat. No. 7,806,777 for Automatically Adapting Virtual Equipment Model, is hereby incorporated by reference in its entirety.

Cheng, U.S. Pat. No. 7,847,808 for Photographic Mapping In A Simulation, is hereby incorporated by reference in its entirety.

Savarese et al., U.S. Pat. No. 8,002,645 for Apparatus, Methods And Systems Relating To Findable Balls, is hereby incorporated by reference in its entirety.

Cheng, U.S. Pat. No. 8,029,359 for Providing Offers To Computer Game Players, is hereby incorporated by reference in its entirety.

Forsgren, U.S. Pat. No. 8,077,917 for Systems And Methods For Enhancing Images in A Video Recording of A Sports Event, is hereby incorporated by reference in its entirety.

Caster et al., U.S. Pat. No. 9,132,326 for a System For Providing Loaner Clubs To Novice Golfers, is hereby incorporated by reference in its entirety.

Forsgren, U.S. patent Ser. No. 10/596,416 for a System And Method For Three Dimensional Object Tracking Using Combination of Radar And Image Data, is hereby incorporated by reference in its entirety.

Semsak et al., U.S. patent Ser. No. 10/799,770 for a RFID Golf Ball Testing Apparatus, is hereby incorporated by reference in its entirety.

Johansson et al., U.S. patent Ser. No. 10/898,757 for Three Dimensional Object Tracking Using Combination of Radar Speed Data And Two Dimensional Image Data, is hereby incorporated by reference in its entirety.

Forsgren et al., U.S. patent Ser. No. 11/335,013 for Motion Based Pre-Processing Of Two-Dimensional Image Data Prior To Three-Dimensional Object Tracking With Virtual Time Synchronization, is hereby incorporated by reference in its entirety.

Forsgren, U.S. Patent Publication Number 20200391077 for a System And Method For Three Dimensional Object Tracking Using Combination of Radar And Image Data, is hereby incorporated by reference in its entirety.

Johansson et al., U.S. patent Ser. No. 11/504,582 for Three Dimensional Object Tracking Using Combination of Radar Speed Data And Two Dimensional Image Data, is hereby incorporated by reference in its entirety.

Eriksson, U.S. patent Ser. No. 11/513,208 for Method For Determining Spin Of A Projectile, is hereby incorporated by reference in its entirety.

Hugmark et al., U.S. patent Ser. No. 11/644,562 for Trajectory Extrapolation And Origin Determination For Objects Tracked Flight, is hereby incorporated by reference in its entirety.

Forsgren, U.S. patent Ser. No. 11/697,046 for a System And Method For Three Dimensional Object Tracking Using Combination of Radar And Image Data, is hereby incorporated by reference in its entirety.

Hugmark et al., U.S. patent Ser. No. 11/771,957 for Trajectory Extrapolation And Origin Determination For Objects Tracked Flight, is hereby incorporated by reference in its entirety.

Levin, U.S. patent Ser. No. 11/409,411 for a Single Finger User Interface Camera Control, is hereby incorporated by reference in its entirety.

Johansson et al., U.S. patent Ser. No. 11/504,582 for Three Dimensional Object Tracking Using Combination of Radar Speed Data And Two Dimensional Image Data, is hereby incorporated by reference in its entirety.

Stroud, U.S. patent Ser. No. 11/779,809, for a Method And System Utilizing A Golf Shot API Proxy, is hereby incorporated by reference in its entirety.

Burdette, U.S. patent application Ser. No. 18/202,178, filed on May 25, 2023, for a Golf Ball Identification Apparatus And System, is hereby incorporated by reference in its entirety.

Burdette et al., U.S. Patent Publication Number 20220203178, for a Golf Ball Dispenser With Embedded Display Device, Separate Front waterfall And/Or Blower Assembly, is hereby incorporated by reference in its entirety.

Ekstrom et al., U.S. patent Ser. No. 11/786,783 for Identifying A Location For A Striker Of An Object, is hereby incorporated by reference in its entirety.

Eriksson et al., U.S. patent Ser. No. 11/815,618 for Doppler Radar Coexistence, is hereby incorporated by reference in its entirety.

Wase, U.S. patent Ser. No. 11/934,085 for a Camera Mounting Post, is hereby incorporated by reference in its entirety.

Burdette et al., U.S. patent Ser. No. 11/944,883, for a Galton Configuration In Golf Ball Receiving Apparatus And Systems, is hereby incorporated by reference in its entirety.

Forsgren et al, U.S. patent Ser. No. 11/995,846 for Three Dimensional Object Tracking Using Unverified Detections Registered By One Or More Sensors, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A mounting assembly for mounting a camera at a construction, the mounting assembly comprising:

a mounting part arranged to be mounted at the construction; and an attachment part arranged to be attached to the camera;

wherein one of the mounting part and the attachment part comprises a first plate body, and two mounting plates that are arranged spaced away from each other, wherein the two mounting plates are arranged to extend away from the first plate body in a vertical plane of the mounting assembly when mounted at the construction, wherein each mounting plate of the two mounting plates comprises a respective open slot having a first arc-shape, and a respective rotation through hole located at a respective center point with respect to the first arc-shape of the respective open slot, wherein the respective rotation through holes of the mounting plates define a common rotation axis (R) that is perpendicular to the two mounting plates, wherein the respective open slot has a respective opening to a respective edge of said each mounting plate for receiving a respective guiding element of the other one of the mounting part and the attachment part, referred to as second part, and wherein the second part comprises:

a second plate body, and two guiding plates that are arranged spaced away from and parallel with each other, wherein the two guiding plates extend away from the second plate body in the vertical plane of the mounting assembly when mounted at the construction, wherein each guiding plate of said two guiding plates comprises the respective guiding element that is arranged to be received by the respective open slot of each mounting plate, via the respective opening, and a respective center through hole that is located to be capable of being aligned with the respective rotation through hole of said each mounting plate when the respective guiding element is located in the respective open slot.

2. The mounting assembly according to claim 1, wherein said each mounting plate comprises a respective closed slot that has a second arc-shape and whose respective center with respect to the second arc-shape of the respective closed slot is located at the respective rotation through hole.

3. The mounting assembly according to claim 2, wherein said each guiding plate comprises a respective further through hole located to be aligned with a part of the respective closed slot when the respective rotation through hole and the respective center through hole are aligned with each other.

4. The mounting assembly according to claim 1, wherein the second plate body comprises a stop edge configured to define a distinct spatial relationship between the first and second parts, wherein the plate body comprises an abutment surface configured to define the distinct spatial relationship, wherein the first and second parts are capable of assuming the distinct spatial relationship when the stop edge abuts the abutment surface and when the respective guiding element is received by the respective open slot, and wherein the respective rotation through hole (241, 242) is aligned with the respective center through hole in the distinct spatial relationship.

5. The mounting assembly according to claim 1, wherein the respective guiding element comprises a respective guiding screw.

6. The mounting assembly according to claim 1, wherein the respective guiding element is perpendicular to said each mounting plate when being received and guided by the respective opening into the respective open slot.

7. The mounting assembly according to claim 1, wherein the mounting part and the attachment part are configured to correspond to each other to adjustably mount the camera at the construction.

8. The mounting assembly according to claim 1, wherein the mounting assembly is arranged to adjustably mount the camera at the construction.

9. The mounting assembly according to claim 1, wherein the respective center point is located relatively a circle defining the first arc-shape, wherein the common rotation axis runs through the respective center point of the respective open slot.

10. The mounting assembly according to claim 1, wherein the respective rotation through hole is located at the respective center point.

11. The mounting assembly according to claim 1, wherein at least one of the two mounting plates and/or at least one of the two guiding plates is/are made of metal.

12. The mounting assembly according to claim 1, wherein the open and/or closed slots are elongated.

13. The mounting assembly according to claim 1, wherein a plurality of slots comprises the respective open slot of said each mounting plate and the respective closed slot of said each guiding plate, wherein at least two of the plurality of slots have a common radius.

14. The mounting assembly according to claim 1 wherein the mounting part and the attachment part are separable from each other.

15. The mounting assembly according to claim 1, wherein at least one of the two mounting plates at least partly surrounds at least one of the two guiding plates.

16. A method for mounting a camera at a construction using a mounting assembly of claim 1, wherein a first part is attached to the camera and a second part is mounted at the construction, wherein the method comprises the steps of:

moving the camera such that a respective guiding element is fed into a respective opening and guided by the respective opening and a respective open slot into a respective position in the respective open slot, tilting the camera until a respective rotation through hole is aligned with a respective center through hole, inserting at least one rotation shaft in the respective rotation through hole and the respective center through hole, adjusting, by rotation of the camera about said at least one rotation shaft, the camera's viewing direction, and fixating the camera by fixating the first part relatively the second part by means of one or more of: when said at least one rotation shaft comprises at least one rotation screw, by fastening said at least one rotation screw; when at least one of the respective guiding element of said two guiding plates comprises a guiding screw, by fastening the guiding screw; and when said each mounting plate comprises a respective closed slot, by fastening at least one respective second screw that has been inserted into the respective closed slot.

17. The method according to claim 16, wherein the titling of the camera comprises titling the camera until a stop edge of a second plate body abuts an abutment surface of a first plate body, thereby the first and second parts are arranged in a distinct spatial relationship relatively each other, wherein the respective rotation through hole is aligned with the respective center through hole in the distinct spatial relationship.

\* \* \* \* \*